United States Patent
Perlee et al.

(10) Patent No.: US 11,041,188 B2
(45) Date of Patent: *Jun. 22, 2021

(54) METHODS OF ASSOCIATING GENETIC VARIANTS WITH A CLINICAL OUTCOME IN PATIENTS SUFFERING FROM AGE-RELATED MACULAR DEGENERATION TREATED WITH ANTI-VEGF

(71) Applicant: Regeneron Pharmaceuticals, Inc., Tarrytown, NY (US)

(72) Inventors: Lorah Perlee, Tarrytown, NY (US); Sara Hamon, Tarrytown, NY (US)

(73) Assignee: Regeneron Pharmaceuticals, Inc., Tarrytown, NY (US)

(*) Notice: Subject to any disclaimer, the term of this patent is extended or adjusted under 35 U.S.C. 154(b) by 29 days.

This patent is subject to a terminal disclaimer.

(21) Appl. No.: 15/989,371

(22) Filed: May 25, 2018

(65) Prior Publication Data

US 2019/0360027 A1 Nov. 28, 2019

(51) Int. Cl.

| C12Q 1/6827 | (2018.01) |
| A61P 27/00 | (2006.01) |
| C12Q 1/6809 | (2018.01) |
| A61K 39/00 | (2006.01) |
| G16H 50/20 | (2018.01) |
| C07K 16/28 | (2006.01) |
| G16B 30/00 | (2019.01) |

(52) U.S. Cl.
CPC .... *C12Q 1/6827* (2013.01); *A61K 39/001135* (2018.08); *A61P 27/00* (2018.01); *C07K 16/28* (2013.01); *C12Q 1/6809* (2013.01); *G16B 30/00* (2019.02); *G16H 50/20* (2018.01)

(58) Field of Classification Search
None
See application file for complete search history.

(56) References Cited

U.S. PATENT DOCUMENTS

| 2009/0017029 A1 | 1/2009 | Hoh et al. | |
| 2011/0159608 A1* | 6/2011 | Graham | C12Q 1/6883 436/501 |
| 2016/0193217 A1* | 7/2016 | Higashi | C07D 413/12 514/236.2 |

FOREIGN PATENT DOCUMENTS

| CN | 104894261 A | 9/2015 |
| JP | 2012-080900 | 4/2012 |
| JP | 2013-126422 | 6/2013 |
| JP | 2014-510526 | 1/2014 |
| WO | 2012125869 | 9/2012 |

OTHER PUBLICATIONS

McKibbin et al., "Aflibercept in wet AMD beyond the first year of treatment: recommendations by an expert roundtable panel", Eye (Lond), 2015, 29(suppl 1), pp. S1-S11.

Heier et al, "The 1-year Results of Clear-It 2, a Phase 2 Study of Vascular Endothelial Growth Factor Trap-Eye Dosed As-needed After 12-week Fixed Dosing", Ophthalmology, 2011, 118(6), pp. 1098-1106.

Abedi et al., "Variants in the VEGFA Gene and Treatment Outcome after Anti-VEGF Treatment for Neovascular Age-related Macular Degeneration", Ophthalmology, 2013, 120(1), pp. 115-121.

Agosta et al., "Pharmacogenetics of antiangiogenic and antineovascular therapies of age-related macular degeneration", Pharmacogenomics, 2012, 13(9), pp. 1037-1053.

Francis, "The influence of genetics of response to treatment with ranibizumab (Lucentis) for age-related macular degeneration: the Lucentis Genotype Study (an American Ophthalmological Society thesis)", Transactions of the American Ophthalmological Society Annual Meeting, 2011, 109, pp. 115-156.

Gorin, "Genetic insights into age-related macular degeneration: Controversies addressing risk, causality, and therapeutics", Molecular Aspects of Medicine, 2012, 33(4), pp. 467-486.

Heier et al., "Intravitreal Aflibercept (VEGF Trap-Eye) in Wet Age-related Macular Degeneration", Am Acad Ophthalmology, 2012, 119 (12), pp. 2537-2548.

Kawashima et al., "Effects of aflibercept for ranibizumab-resistant neovascular age-related macular degeneration and polypoidal choroidal vasculopathy", Graefe's Archive for Clinical and Experimental Ophthalmology, 2014, 253(9), pp. 1471-1477.

Myers et al., "Optimal Alignments in Linear Space", CABIOS, 1988, 4(1), pp. 11-17.

Needleman et al., "A General Method Applicable to the Search for Similarities in the Amino Acid Sequence of Two Proteins", J Mol Biol, 1970, 48, pp. 443-453.

Wang et al., "Suggestive association between PLA2G12A single nucleotide polymorphism re2285714 and response to anti-vascular endothelial growth factor therapy in patients with exudative age-related macular degeneration" Molecular Vision, 2012, 18, pp. 2578-2585.

International Search Report and Written Opinion for PCT/2016/064403 (WO 17/96031) (10217WO01).

Klettner et al., "Comparison of Bevacizumab, Ranibizumab, and Pegaptanib In Vitro: Efficiency and Possible Additional Pathways", Investigative Ophthalmology and Visual Science, 2008, 49(10), pp. 4523-4527.

Semeraro et al., "Pharmacokinetic and Pharmacodynamic Properties of Anti-VEGF Drugs After Intravitreal Injection", Current Drug Metabolism, 2015, 16(7), pp. 572-584.

Malik et al., "Safety profiles of anti-VEGF drugs: bevacizumab, ranibizumab, aflibercept and ziv-aflibercept on human retinal pigment epithelium cells in culture", Br J Ophthalmol, 2014, 98, pp. i11-i16.

(Continued)

*Primary Examiner* — Katherine D Salmon
(74) *Attorney, Agent, or Firm* — Stradley Ronon Stevens & Young, LLP

(57) ABSTRACT

Disclosed herein are methods and compositions for associating a genetic variant with intraretinal fluid. Also disclosed herein are methods and compositions for associating a genetic variant with visual acuity, anatomic outcomes or treatment frequency.

16 Claims, 8 Drawing Sheets

(56) References Cited

OTHER PUBLICATIONS

Zehetner et al., "Systemic Counterregulatory Response of Placental Growth Factor Levels to Intravitreal Aflibercept Therapy", IVOS, 2015, 56(5), pp. 3279-3286.

Ashraf et al., "Aflibercept in age-related macular degeneration: evaluating its role as a primary therapeutic option", Eye, 2017, pp. 1-14.

Stewart et al., "Pharmacokinetic rationale for dosing every 2 weeks versus 4 weeks with intravitreal ranibizumab, bevacizumab, aflibercept (vascular endothelial growth factor trap-eye)", Retina, 2012, 32(3), pp. 434-457.

* cited by examiner

|  | VIEW 1 | VIEW 1 PGx |
|---|---|---|
| n (full analysis set) | 1210 | 362 |
| Completed study, n (%) | 1174 (96.6%) | 320 (88.2%) |
| Women, n (%) | 711 (58.8%) | 203 (56.1%) |
| White, n (%) | 1169 (96.6%) | 352 (97.2%) |
| Mean age, years (SD) | 78.1 (8.0) | 77.8 (7.8) |
| BCVA, letters (SD) | 55.1 (13.1) | 55.5 (12.9) |
| CRT, μm (SD) | 316.6 (107.2) | 312.9 (108.7) |
| Baseline CNV area, mm² (SD) | 6.6 (5.0) | 6.10 (4.7) |
| Baseline Type of CNV, n (%) | | |
| Occult | 464 (38.3%) | 129 (35.6%) |
| Minimally Classic | 424 (35.0%) | 129 (35.6%) |
| Predominantly | 311 (25.7%) | 101 (27.9%) |
| Missing/Other | 11 (<0.1%) | 3 (0.8%) |

Figure 2

| Phenotype | POS | CHR | Closest Gene | SNP | N | OR | P | REF |
|---|---|---|---|---|---|---|---|---|
| Gain 15 Letters | 140765 | 3 | MECOM-004 | rs2106124 | 301 | 2.471 | 9.51E-06 | A |
| Gain 15 Letters | 140766 | 3 | MECOM-004 | rs1879796 | 301 | 2.477 | 9.20E-06 | T |
| Gain 15 Letters | 528346 | 15 | NTRK3 | rs12148845 | 301 | 2.621 | 4.88E-06 | G |
| Gain 15 Letters | 528351 | 15 | NTRK3 | rs12148100 | 301 | 2.587 | 7.15E-06 | T |
| Presence Retinal Fluid | 641343 | 23 | PRKX | rs20566888 | 271 | 0.2578 | 7.27E-07 | A |
| Presence Retinal Fluid | 641345 | 23 | PRKX | rs5962084 | 271 | 0.3461 | 8.59E-06 | G |
| Presence Retinal Fluid | 641347 | 23 | PRKX | rs5962087 | 271 | 0.3151 | 5.48E-06 | A |
| Presence Retinal Fluid | 641349 | 23 | PRKX | rs5915722 | 271 | 0.3406 | 7.38E-06 | C |
| Presence Retinal Fluid | 641353 | 23 | PRKX | rs5963095 | 271 | 0.3461 | 8.59E-06 | C |
| Injections > 7 | 1688932 | 4 | ANK2 | rs174482885 | 305 | 3.808 | 5.03E-06 | G |
| Injections > 7 | 1688950 | 4 | ANK2 | rs176290119 | 305 | 3.575 | 9.36E-06 | A |

Figure 8

METHODS OF ASSOCIATING GENETIC VARIANTS WITH A CLINICAL OUTCOME IN PATIENTS SUFFERING FROM AGE-RELATED MACULAR DEGENERATION TREATED WITH ANTI-VEGF

FIELD

The present disclosure is directed, in part, to methods and compositions for associating a genetic variant with visual acuity and anatomic outcomes, and treatment of macular degeneration patients.

BACKGROUND

Macular degeneration is a serious medical condition, in which intraretinal fluid builds up and can damage the retina, resulting in loss of vision in the center of the visual field. Macular degeneration can be age-related. "Dry" (nonexudative") and "wet" ("neovascular" or "exudative") forms of macular degeneration have been recognized.

In neovascular macular degeneration, vision loss can be due to abnormal blood vessel growth (choroidal neovascularization). Proliferation of abnormal blood vessels in the retina is stimulated by vascular endothelial growth factor (VEGF). The new vessels are fragile, and can lead to blood and protein leakage below the macula. Bleeding, leaking, and scarring from those blood vessels can eventually cause irreversible damage to the photoreceptors and rapid vision loss.

EYLEA® (aflibercept) injection and Lucentis© (ranibizumab) are biologic drugs that havebeen approved in the United States and Europe for the treatment of wet macular degeneration. Aflibercept and ranibizumab are VEGF inhibitors.

SUMMARY

Disclosed herein are methods of associating a genetic variant with visual acuity, anatomic outcomes or treatment frequency, the method comprising: statistically associating (i) one or more genetic variants in a population of neovascular age-related macular degeneration subjects who have been administered aflibercept or ranibizumab with (ii) an anatomical outcome in the same population of neovascular age-related macular degeneration subjects.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a the presence of intraretinal cystoid edema (fluid), compared to the absence of intraretinal cystoid edema (fluid) after one year of treatment.

Disclosed herein are methods of associating a genetic variant with intraretinal fluid, the method comprising: statistically associating (a) one or more genetic variants in a population of neovascular age-related macular degeneration subjects with (b) intraretinal fluid in the same population of neovascular age-related macular degeneration subjects, wherein the one or more genetic variants is associated with a lower level of intraretinal fluid in neovascular age-related macular degeneration subjects treated with an intravitreal anti-VEGF agent and who have one or two copies of the genetic variant allele, compared to the level of intraretinal fluid in neovascular age-related macular degeneration subjects treated with an intravitreal anti-VEGF agent and who do not have a copy of the genetic variant allele.

Disclosed herein are methods for treating a macular degeneration patient with a vascular endothelial growth factor (VEGF) inhibitor, comprising the steps of: determining whether the patient has one or more genetic variants associated with visual acuity and/or anatomic outcome by: performing or having performed a genotype assay on a DNA sample obtained from the patient to determine if the patient has one or more genetic variants associated with visual acuity and/or anatomic outcome; and when the patient has one or more of the genetic variants associated with improved visual acuity and/or anatomic outcome, and when the patient exhibits improved visual acuity and/or anatomic outcome after about one year of administering the VEGF inhibitor to the patient, modifying the dosing frequency of administering about 2 mg of the VEGF inhibitor to the patient from about every 8 weeks to about every 9 to 12 weeks to the patient; or when the patient does not have one or more of the genetic variants associated with improved visual acuity and/or anatomic outcome, and when the patient does not exhibit improved visual acuity and/or anatomic outcome after about one year of administering the VEGF inhibitor to the patient, modifying the dosing frequency of administering about 2 mg of the VEGF inhibitor to the patient from about every 8 weeks to about every 4 to 6 weeks to the patient.

BRIEF DESCRIPTION OF THE DRAWINGS

The accompanying drawings, which are incorporated in and constitute a part of this specification, illustrate several embodiments of the disclosed method and compositions and together with the description, serve to explain the principles of the disclosed method and compositions.

FIG. 2 shows baseline characteristics and clinical demographics of a PGx Substudy including gender, age, race, visual acuity and lesion type that were reflective of distributions observed in the VIEW 1 full analysis set.

FIG. 8 shows the SNPs identified in the study of the examples herein.

DETAILED DESCRIPTION

Figure 1:
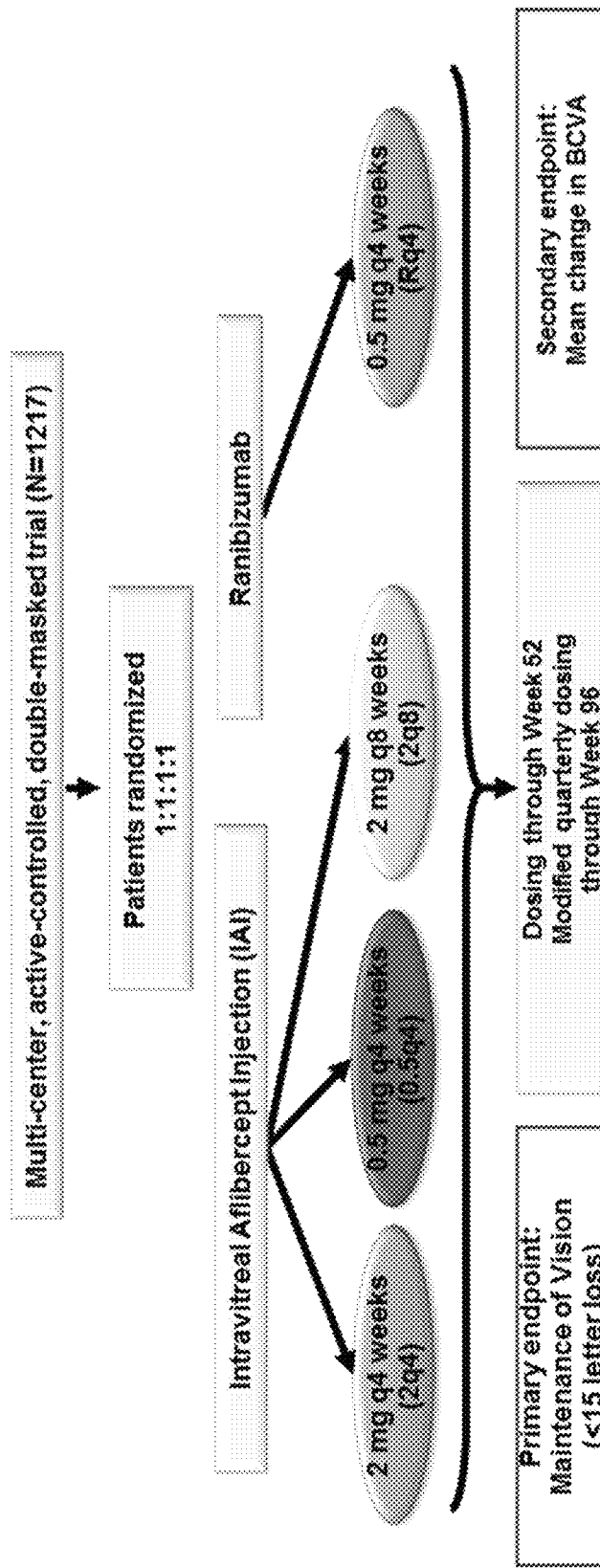
FIG. 1 shows an overview of a statistical study used to identify genetic variants associated with anti-VEGF drug response as measured by visual acuity, anatomic outcomes and treatment frequency in the VIEW 1 study.

The disclosed method and compositions may be understood more readily by reference to the following detailed description of particular embodiments and the Example included therein and to the Figures and their previous and following description.

It is to be understood that the disclosed method and compositions are not limited to specific synthetic methods, specific analytical techniques, or to particular reagents unless otherwise specified, and, as such, may vary. It is also to be understood that the terminology used herein is for the purpose of describing particular embodiments only and is not intended to be limiting.

It is understood that the disclosed methods and compositions are not limited to the particular methodology, protocols, and reagents described as these may vary. It is also to be understood that the terminology used herein is for the purpose of describing particular embodiments only, and is not intended to limit the scope of the present invention which will be limited only by the appended claims.

Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Disclosed are materials, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a PRR antagonist is disclosed and discussed and a number of modifications that can be made are discussed, each and every combination and permutation of the PRR antagonist and the modifications that are possible are specifically contemplated unless specifically indicated to the contrary. Thus, if a class of molecules A, B, and C are disclosed as well as a class of molecules D, E, and F and an example of a combination molecule, A-D is disclosed, then even if each is not individually recited, each is individually and collectively contemplated. Thus, is this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Definitions

As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values described herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data are provided in a number of different formats, and that these data, represent endpoints, starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units is also disclosed. For example, if 10 and 15 are disclosed, then 11, 12, 13, and 14 are also disclosed.

"Optional" or "optionally" means that the subsequently described event or circumstance may or may not occur and that the description includes instances where said event or circumstance occurs and instances where it does not.

The word "or" as used herein means any one member of a particular list and also includes any combination of members of that list.

As used herein, the term "subject" means an individual. In one aspect, a subject is a mammal such as a human. In one aspect a subject can be a non-human primate. Non-human primates include marmosets, monkeys, chimpanzees, gorillas, orangutans, and gibbons, to name a few. The term "subject" also includes domesticated animals, such as cats, dogs, etc., livestock (for example, cattle (cows), horses, pigs, sheep, goats, etc.), laboratory animals (for example, ferret, chinchilla, mouse, rabbit, rat, gerbil, guinea pig, etc.) and avian species (for example, chickens, turkeys, ducks, pheasants, pigeons, doves, parrots, cockatoos, geese, etc.). Subjects can also include, but are not limited to fish (for example, zebrafish, goldfish, tilapia, salmon, and trout), amphibians and reptiles. As used herein, a "subject" is the same as a "patient," and the terms can be used interchangeably.

The term "polymorphism" refers to the occurrence of one or more genetically determined alternative sequences or alleles in a population. A "polymorphic site" is the locus at which sequence divergence occurs. Polymorphic sites have at least one allele. A diallelic polymorphism has two alleles. A triallelic polymorphism has three alleles. Diploid organisms may be homozygous or heterozygous for allelic forms. A polymorphic site can be as small as one base pair. Examples of polymorphic sites include: restriction fragment length polymorphisms (RFLPs), variable number of tandem repeats (VNTRs), hypervariable regions, minisatellites, dinucleotide repeats, trinucleotide repeats, tetranucleotide repeats, and simple sequence repeats. As used herein, reference to a "polymorphism" can encompass a set of polymorphisms (i.e., a haplotype).

A "single nucleotide polymorphism (SNP)" can occur at a polymorphic site occupied by a single nucleotide, which is the site of variation between allelic sequences. The site can be preceded by and followed by highly conserved sequences of the allele. A SNP can arise due to substitution of one nucleotide for another at the polymorphic site. Replacement of one purine by another purine or one pyrimidine by another pyrimidine is called a transition. Replacement of a purine by a pyrimidine or vice versa is called a transversion. A synonymous SNP refers to a substitution of one nucleotide for another in the coding region that does not change the amino acid sequence of the encoded polypeptide. A non-synonymous SNP refers to a substitution of one nucleotide for another in the coding region that changes the amino acid sequence of the encoded polypeptide. A SNP may also arise from a deletion or an insertion of a nucleotide or nucleotides relative to a reference allele.

A "set" of polymorphisms means one or more polymorphism, e.g., at least 1, at least 2, at least 3, at least 4, at least 5, at least 6, or more than 6 polymorphisms.

As used herein, a "nucleic acid," "polynucleotide," or "oligonucleotide" can be a polymeric form of nucleotides of any length, can be DNA or RNA, and can be single- or double-stranded. Nucleic acids can include promoters or other regulatory sequences. Oligonucleotides can be prepared by synthetic means. Nucleic acids include segments of DNA, or their complements spanning or flanking any one of the polymorphic sites. The segments can be between 5 and 100 contiguous bases and can range from a lower limit of 5, 10, 15, 20, or 25 nucleotides to an upper limit of 10, 15, 20, 25, 30, 50, or 100 nucleotides (where the upper limit is greater than the lower limit). Nucleic acids between 5-10, 5-20, 10-20, 12-30, 15-30, 10-50, 20-50, or 20-100 bases are common. The polymorphic site can occur within any position of the segment. A reference to the sequence of one strand of a double-stranded nucleic acid defines the complementary sequence and except where otherwise clear from context, a reference to one strand of a nucleic acid also refers to its complement.

"Nucleotide" as described herein refers to molecules that, when joined, make up the individual structural units of the nucleic acids RNA and DNA. A nucleotide is composed of a nucleobase (nitrogenous base), a five-carbon sugar (either ribose or 2-deoxyribose), and one phosphate group.

"Nucleic acids" are polymeric macromolecules made from nucleotide monomers. In DNA, the purine bases are adenine (A) and guanine (G), while the pyrimidines are thymine (T) and cytosine (C). RNA uses uracil (U) in place of thymine (T).

As used herein, the term "genetic variant" or "variant" refers to a nucleotide sequence in which the sequence differs from the sequence most prevalent in a population, for example by one nucleotide, in the case of the SNPs described herein. For example, some variations or substitutions in a nucleotide sequence alter a codon so that a different amino acid is encoded resulting in a genetic variant polypeptide. Other non-limiting examples of genetic variants include, insertions, deletions, indels, frameshift variants, stop codon variants, synonymous variants, non-synonymous variants and copy number variants (e.g., deletions and duplications). The term "genetic variant," can also refer to a polypeptide in which the sequence differs from the sequence most prevalent in a population at a position that does not change the amino acid sequence of the encoded polypeptide (i.e., a conserved change). Genetic variant polypeptides can be encoded by a risk haplotype, encoded by a protective haplotype, or can be encoded by a neutral haplotype. Genetic variant polypeptides can be associated with risk, associated with protection, or can be neutral.

By "isolated nucleic acid" or "purified nucleic acid" is meant DNA that is free of the genes that, in the naturally-occurring genome of the organism from which the DNA of the invention is derived, flank the gene. The term therefore includes, for example, a recombinant DNA which is incorporated into a vector, such as an autonomously replicating plasmid or virus; or incorporated into the genomic DNA of a prokaryote or eukaryote (e.g., a transgene); or which exists as a separate molecule (for example, a cDNA or a genomic or cDNA fragment produced by PCR, restriction endonuclease digestion, or chemical or in vitro synthesis). It also includes a recombinant DNA which is part of a hybrid gene encoding additional polypeptide sequence. The term "isolated nucleic acid" also refers to RNA, e.g., an mRNA molecule that is encoded by an isolated DNA molecule, or that is chemically synthesized, or that is separated or substantially free from at least some cellular components, for example, other types of RNA molecules or polypeptide molecules.

As used herein, "treated" or "treating" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder. In various aspects, the term covers any treatment of a subject, including a mammal (e.g., a human), and includes: (i) preventing the disease from occurring in a subject that can be predisposed to the disease but has not yet been diagnosed as having it; (ii)

inhibiting the disease, i.e., arresting its development; or (iii) relieving the disease, i.e., causing regression of the disease.

The terms "administering", "administered" and "administration" refer to any method of providing a pharmaceutical preparation to a subject. Such methods are well known to those skilled in the art and include, but are not limited to, oral administration, sublingual administration, trans-buccal mucosa administration, transdermal administration, administration by inhalation, nasal administration, topical administration, intravaginal administration, ophthalmic administration, intraaural administration, intracerebral administration, intrathecal administration, rectal administration, intraperitoneal administration, and parenteral administration, including injectable such as intravenous administration, intra-arterial administration, intramuscular administration, intradermal administration, and subcutaneous administration. Ophthalmic administration can include topical administration, subconjunctival administration, sub-Tenon's administration, epibulbar administration, retrobulbar administration, intra-orbital administration, and intraocular administration, which includes intra-vitreal administration. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

Calculations of sequence similarity or sequence identity between sequences (the terms are used interchangeably herein) are performed as follows. To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). In certain embodiments, the length of a reference sequence aligned for comparison purposes is at least 30%, preferably at least 40%, more preferably at least 50%, 60%, and even more preferably at least 70%, 80%, 90%, 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position.

The percent identity between the two sequences is a function of the number of identical positions shared by the sequences, taking into account the number of gaps, and the length of each gap, which need to be introduced for optimal alignment of the two sequences.

The comparison of sequences and determination of percent identity between two sequences can be accomplished using a mathematical algorithm. In a preferred embodiment, the percent identity between two amino acid sequences is determined using the Needleman and Wunsch, (1970, J. Mol. Biol. 48: 444-453) algorithm which has been incorporated into the GAP program in the GCG software package, using either a Blossum 62 matrix or a PAM250 matrix, and a gap weight of 16, 14, 12, 10, 8, 6, or 4 and a length weight of 1, 2, 3, 4, 5, or 6. In yet another preferred embodiment, the percent identity between two nucleotide sequences is determined using the GAP program in the GCG software package, using a NWSgapdna. CMP matrix and a gap weight of 40, 50, 60, 70, or 80 and a length weight of 1, 2, 3, 4, 5, or 6. A particularly preferred set of parameters (and the one that should be used unless otherwise specified) are a Blossum 62 scoring matrix with a gap penalty of 12, a gap extend penalty of 4, and a frameshift gap penalty of 5.

The percent identity between two amino acid or nucleotide sequences can be determined using the algorithm of E. Meyers and W. Miller (1989, Cabios, 4: 11-17) which has been incorporated into the ALIGN program (version 2.0), using a PAM120 weight residue table, a gap length penalty of 12 and a gap penalty of 4.

Unless defined otherwise, all technical and scientific terms used herein have the same meanings as commonly understood by one of skill in the art to which the disclosed method and compositions belong. Although any methods and materials similar or equivalent to those described herein can be used in the practice or testing of the present method and compositions, the particularly useful methods, devices, and materials are as described. Publications cited herein and the material for which they are cited are hereby specifically incorporated by reference. Nothing herein is to be construed as an admission that the present invention is not entitled to antedate such disclosure by virtue of prior invention. No admission is made that any reference constitutes prior art. The discussion of references states what their authors assert, and applicants reserve the right to challenge the accuracy and pertinency of the cited documents. It will be clearly understood that, although a number of publications are referred to herein, such reference does not constitute an admission that any of these documents forms part of the common general knowledge in the art.

Those skilled in the art will recognize, or be able to ascertain using no more than routine experimentation, many equivalents to the specific embodiments of the method and compositions described herein. Such equivalents are intended to be encompassed by the following claims.

Methods

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with the presence of intraretinal cystoid edema (fluid), compared to the absence of intraretinal cystoid edema (fluid) after one year of treatment.

Examples of anti-VEGF agent or intravitreal anti-VEGF agent include, but is not limited to, bevacizumab, ranibizumab, ramucirumab, aflibercept, sunitinib, sorafenib, vandetanib, vatalanib, tivozanib, axitinib, imatinib or pazopanib Disclosed herein are methods of associating a genetic variant with visual acuity, anatomic outcomes or treatment frequency, the method comprising: comparing the anatomical outcome in the population of neovascular age-related macular degeneration subjects who have been administered an intravitreal anti-VEGF agent and who have one or two copies of the genetic variant allele with the anatomical outcome of a population of neovascular age-related macular degeneration subjects who have been administered an intravitreal anti-VEGF agent and who do not have a copy of the genetic variant allele; and statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent for one year with (ii) an anatomical outcome in the same population of neovascular age-related macular degeneration subjects, wherein one or more genetic variants is associated with the presence of intraretinal cystoid edema (fluid) in subjects who have one or two copies of the genetic variant allele, compared to the level of intraretinal cystoid edema (fluid) in subjects who do not have a copy of the genetic variant allele.

Disclosed herein are methods of associating a genetic variant with visual acuity, anatomic outcomes or treatment frequency, the method comprising: comparing the anatomical outcome in the population of neovascular age-related macular degeneration subjects who have been administered an intravitreal anti-VEGF agent and who have one or two copies of the genetic variant allele with the anatomical outcome of a population of neovascular age-related macular degeneration subjects who have been administered an intravitreal anti-VEGF agent and who do not have a copy of the genetic variant allele; and statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein DNA samples from the subjects are genotyped prior to the step of statistical association. In some aspects, the anatomic outcome is a Gain of 15 letters (visual acuity). In some aspects, the treatment frequency can reflect an ongoing requirement for aggressive treatment with an intravitreal anti-VEGF agent after one full year of dosing.

The statistical associations described herein can include logistic regression analyses, QC of the genetic data including Hardy-Weinberg Equilibrium (HWE) tests, identity by state (IBS) estimates and/or gender confirmation. The population structure can be assessed using principal component analysis (PCA). The statistical associations can include logistic regression with baseline values and any potential population structure variables as covariates in the model.

In some aspects the anatomical outcome is the presence of intraretinal cystoid edema, a gain in vision/improved visual acuity, or a decrease in intraretinal fluid. Additional anatomical outcomes that can be used include, but are not limited to, a reduction in central retinal thickness as measured by optical coherence tomography (OCT), complete resolution of both intraretinal and subretinal fluid, reduction in choroidal neovascular (CNV) area, reduction in total neovascular lesion size as measured by fluorescence angiography, and reduction in subretinal hyperreflectivity (SHM) material as measured by OCT.

In some aspects, the statistical association can be measured as a p-value. For example different types of p-values can be obtained: simple t-test p-values for the original data and log-transformed data both assuming equal variances, and chebby checker p-values. These p-values can be presented on an individual basis as well as by taking multiple comparisons into account. The mix-o-matic method can be applied to provide additional information about these p-values. In some aspects, the p-value of the association is less than or equal to $1\times10^{-5}$, $1\times10^{-6}$, $1\times10^{-7}$, $1\times10^{-8}$, etc. In some aspects, the p-value of the association is less than or equal to $1\times10^{-5}$, i.e., suggestive statistical significant and $1\times10^{-8}$ i.e. experiment wise statistical significance.

In some aspects, the effect size of a statistical association can be measured as an odds ratio. For example, the effect size of a statistical association can be measured as the ratio of the odds of the presence of intraretinal cystoid edema (fluid) in neovascular age-related macular degeneration subjects treated with an intravitreal anti-VEGF agent and who have 1 or 2 copies of an allele, to the ratio of the odds of the presence of intraretinal cystoid edema (fluid) in neovascular age-related macular degeneration subjects treated with an intravitreal anti-VEGF agent and who do not have the copy of the allele. In some aspects, the odds ratio is less than or equal to 0.2, 0.3, 0.4, 0.5, 0.6, 0.7, 0.8 or 0.9. Having one copy of the allele would have a smaller influence than individuals who have two copies of the allele.

In some aspects, the statistical association can be measured as the ratio of the odds of the Gain of 15 letters (visual acuity) in neovascular age-related macular degeneration subjects treated with an intravitreal anti-VEGF agent and who have 1 or 2 copies of an allele, to the ratio of the odds of the Gain of 15 letters in neovascular age-related macular degeneration subjects treated with an intravitreal anti-VEGF agent and who do not have the copy of the allele. In some aspects, the odds ratio is greater than or equal to 2.4, 2.5, 2.6, 2.7, 2.8 or 2.9.

In some aspects, the statistical association can be measured as the ratio of the odds of neovascular age-related macular degeneration subjects who have a higher requirement for on-going aggressive treatment with an intravitreal anti-VEGF agent and who have 1 or 2 copies of an allele, to the odds of neovascular age-related macular degeneration subjects who have a lower requirement for on-going aggressive treatment with an intravitreal anti-VEGF agent and who do not have the copy of the allele. In some aspects, the odds ratio is less than or equal to 4.0, 3.9, 3.8, 3.7, 3.6, 3.5, 3.4, 3.3, or 3.2

In some aspects the methods can be used to associate a genetic variant with visual acuity, anatomic outcomes or treatment frequency. In some aspects, the genetic variant can be one or more single nucleotide polymorphisms.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a reduced level of presence of intraretinal cystoid edema (fluid), after one year of treatment.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein the one or more genetic variants is associated with a decreased level of intraretinal fluid in subjects who have 1 or 2 copies of a genetic variant allele, compared to the level of intraretinal fluid in neovascular age-related macular degeneration subjects administered an intravitreal anti-VEGF agent and who do not have a copy of the genetic variant allele.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a the presence of intraretinal cystoid edema (fluid), compared to the absence of intraretinal cyctoid edema (fluid) after one year of treatment.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein the one or more genetic variants is associated with a decreased intraretinal fluid, compared to the level of intraretinal fluid in neovascular age-related macular degeneration subjects not treated with an intravitreal anti-VEGF agent, wherein the genetic variant is a single nucleotide polymorphism is selected from the group consisting of rs2056688, rs5962084, rs5962087, rs5915722 and rs5962095. In some aspects, the genetic variant is a single nucleotide polymorphism selected from the group consisting of rs2056688, rs5962084, rs5962087, rs5915722, rs5962095, rs2106124, rs1879796, rs12148845, rs12148100, rs17482885 and rs17629019.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a the presence of intraretinal cystoid edema (fluid), compared to the absence of intraretinal cystoid edema (fluid) after one year of treatment.

Disclosed herein are methods of associating a genetic variant with intraretinal fluid, the method comprising: statistically associating (a) one or more genetic variants in a population of neovascular age-related macular degeneration subjects with (b) intraretinal fluid in the same population of neovascular age-related macular degeneration subjects, wherein the one or more genetic variants is associated with reduced intraretinal fluid in neovascular age-related macular degeneration subjects treated with an intravitreal anti-VEGF agent, compared to the level of intraretinal fluid in neovascular age-related macular degeneration subjects not treated with an intravitreal anti-VEGF agent, wherein reduced intraretinal fluid is improved visual acuity in in neovascular age-related macular degeneration subjects treated with an intravitreal anti-VEGF agent, compared to the level of intraretinal fluid in neovascular age-related macular degeneration subjects not treated with an intravitreal anti-VEGF agent.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a the presence of intraretinal cystoid edema (fluid), compared to the absence of intraretinal cystoid edema (fluid) after one year of treatment.

Disclosed herein are methods of associating a genetic variant with intraretinal fluid, the method comprising: statistically associating (a) one or more genetic variants in a population of neovascular age-related macular degeneration subjects with (b) intraretinal fluid in the same population of neovascular age-related macular degeneration subjects, wherein the one or more genetic variants is associated with reduced intraretinal fluid in neovascular age-related macular degeneration subjects treated with an intravitreal anti-VEGF agent, compared to the level of intraretinal fluid in neovascular age-related macular degeneration subjects not treated with an intravitreal anti-VEGF agent, wherein the p-value of the association is less than or equal to $1 \times 10^{-6}$.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a the presence of intraretinal cystoid edema (fluid), compared to the absence of intraretinal cystoid edema (fluid) after one year of treatment.

Disclosed herein are methods of associating a genetic variant with intraretinal fluid, the method comprising: statistically associating (a) one or more genetic variants in a population of neovascular age-related macular degeneration subjects with (b) intraretinal fluid in the same population of neovascular age-related macular degeneration subjects, wherein the one or more genetic variants is associated with reduced intraretinal fluid in neovascular age-related macular degeneration subjects treated with an intravitreal anti-VEGF agent, compared to the level of intraretinal fluid in neovascular age-related macular degeneration subjects not treated with an intravitreal anti-VEGF agent, wherein the odds ratio of reduced intraretinal fluid in neovascular age-related macular degeneration subjects treated with an intravitreal anti-VEGF agent to reduced intraretinal fluid in neovascular age-related macular degeneration subjects not treated with an intravitreal anti-VEGF agent is less than or equal to 0.5.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a the presence of intraretinal cystoid edema (fluid), compared to the absence of intraretinal cystoid edema (fluid) after one year of treatment.

Disclosed herein are methods of associating a genetic variant with intraretinal fluid, the method comprising: statistically associating (a) one or more genetic variants in a population of neovascular age-related macular degeneration subjects with (b) intraretinal fluid in the same population of neovascular age-related macular degeneration subjects, wherein the one or more genetic variants is associated with reduced intraretinal fluid in neovascular age-related macular degeneration subjects treated with an intravitreal anti-VEGF agent, compared to the level of intraretinal fluid in neovascular age-related macular degeneration subjects not treated with an intravitreal anti-VEGF agent, wherein the genetic variant is a single nucleotide polymorphism.

Disclosed herein are methods of associating a genetic variant with visual acuity, anatomic outcomes or treatment frequency, the method comprising: (a) statistically associating (i) one or more genetic variants in a population of neovascular age-related macular degeneration subjects who have been administered an intravitreal anti-VEGF agent with (ii) an anatomical outcome in the same population of neovascular age-related macular degeneration subjects, wherein one or more genetic variants is associated with a the presence of intraretinal cystoid edema (fluid), compared to the absence of intraretinal cystoid edema (fluid) after one year of treatment.

Disclosed herein are methods of associating a genetic variant with intraretinal fluid, the method comprising: statistically associating (a) one or more genetic variants in a population of neovascular age-related macular degeneration subjects with (b) intraretinal fluid in the same population of neovascular age-related macular degeneration subjects, wherein the one or more genetic variants is associated with reduced intraretinal fluid in neovascular age-related macular degeneration subjects treated with an intravitreal anti-VEGF agent, compared to the level of intraretinal fluid in neovascular age-related macular degeneration subjects not treated with an intravitreal anti-VEGF agent, wherein the genetic variant is a single nucleotide polymorphism, wherein the single nucleotide polymorphism is selected from the group consisting of rs2056688, rs5962084, rs5962087, rs5915722 and rs5962095.

The present disclosure also provides methods of treating a subject having macular degeneration. In some embodiments, the treatment methods comprise a genotyping component based on the genotypes, genetic variants, SNPs, and/or association methods described or exemplified herein, carried out on a subject before the subject has been treated with a vascular endothelial growth factor (VEGF) inhibitor. In some embodiments, the treatment methods comprise a genotyping component based on the genotypes, genetic variants, SNPs, and/or association methods described or exemplified herein, carried out on a subject after the subject has been treated with a VEGF inhibitor for at least about one year, or has been treated with a VEGF inhibitor for a number (e.g., 2, 3, 5, 7, 9, etc.) of months within the first year of a treatment regimen. In such embodiments, the genotyping can, for example, set expectations concerning the potential outcomes from an initial (e.g., first year) dosing regimen with a VEGF inhibitor. By way of example, the subject may have one or more gene variants associated with improved visual acuity and/or anatomic outcomes from treatment with a VEGF inhibitor such as aflibercept, such that identification of such variants (or lack thereof) in the subject informs of how visual acuity and/or anatomic outcome are likely to change after the first year of treatment with the VEGF inhibitor. Then, following the first year of treatment with the VEGF inhibitor, the subject's genotype may be used as part of a reassessment protocol to make modifications to the VEGF inhibitor treatment regimen, especially with respect to the dosing frequency (e.g., how frequently the VEGF inhibitor is administered).

This reassessment at the end of the about one year treatment (or initially prior to the beginning of any treatment regimen) may be accompanied by a physician's evaluation of the subject's eye (e.g., retina). In some embodiments, a subject is evaluated about every 3 to 5 weeks after the first year of treatment. In some embodiments, a subject is evaluated about every 4 weeks after the first year of treatment. The evaluation can include determining whether any one or more of the following has or is occurring in the subjects eye: i) increase in central retinal thickness of ≥100 μm compared to the lowest previous value as measured by Optical Coherence Tomography (OCT); ii) a loss from the best previous letter score of ≥5 ETDRS letters in conjunction with recurrent fluid as indicated by OCT; iii) new or persistent fluid as indicated by OCT; iv) new onset of classic neovascularization; v) new or persistent leak on Fluorescein Angiography (FA); vi) new macular hemorrhage; and/or vii) 12 weeks have elapsed since the previous injection. Upon occurrence of any one or more of these features, the subject's injection regimen after the first year of initial treatment (or at the beginning of the initial treatment) may be increased in frequency as described herein.

Based, in part, on the subject's genotype and on the subject's response (e.g., changes (positive, negative, or none) in visual acuity and/or one or more anatomic outcomes) after about a year of a treatment regimen based on administration of a VEGF inhibitor, the dosing frequency of the treatment regimen may be modified. For example, the dosing frequency may be shortened or elongated. The modifications to the dosing frequency may follow a clinician's evaluation of the subject's visual acuity and/or one or more anatomic outcomes as part of a reassessment process following the initial treatment protocol (e.g., first year of VEGF inhibitor administration) has been carried out on the subject.

By way of example, during the first year of treatment, a subject may receive a treatment regimen comprising administering about 2 mg of a VEGF inhibitor such as aflibercept (e.g., EYLEA®) about every 4 weeks for a period of about 3 months, followed by administering about 2 mg of the VEGF inhibitor about every 8 weeks for a period of about 9 months. When the subject does not have one or more gene variants associated with improved visual acuity and/or anatomic outcomes from treatment with a VEGF inhibitor, and when the patient does not exhibit improved visual acuity and/or an improvement in one or more anatomic outcomes after about one year of administering the VEGF inhibitor, the dosing frequency may be reduced from administration every 8 weeks to about every 7 weeks, to about every 6 weeks, to about every 5 weeks, or to about every 4 weeks. Further periodic reassessments by the clinician may be used to further reduce, or increase, as the case may be, the dosing frequency in order to bring about improvement in visual acuity and/or one or more anatomic outcomes from treatment with a VEGF inhibitor. For example, as a result of one or more further periodic reassessments, the dosing frequency may be further reduced from about every 6 weeks to about every 4 weeks, or about every 7 weeks to about every 6 weeks, etc.

When the subject has one or more gene variants associated with improved visual acuity and/or anatomic outcomes from treatment with a VEGF inhibitor, and when the subject exhibits improved visual acuity and/or an improvement in one or more anatomic outcomes after one year of administering the VEGF inhibitor, the dosing frequency may be increased from every 8 weeks to administration about every 9 weeks, to about every 10 weeks, to about every 11 weeks, to about every 12 weeks, to about every 13 weeks, to about every 14 weeks, to about every 15 weeks, or to about every 16 weeks. One or more further periodic reassessments by the clinician may be used to further increase, or reduce, as the case may be, the dosing frequency in order to sustain or bring about further improvement in visual acuity and/or one or more anatomic outcomes from treatment with a VEGF inhibitor, as well as compliance with the treatment regimen. For example, as a result of one or more further periodic reassessments, the dosing frequency may be further increased from about every 10 weeks to about every 12 weeks, or about every 9 weeks to about every 10 weeks, etc.

Thus, the methods of treatment may comprise the steps of: a) determining whether the subject has one or more genetic variants associated with visual acuity and/or anatomic outcome by performing or having performed a genotype assay on a DNA sample obtained from the subject to determine if the subject has one or more genetic variants associated with improved visual acuity and/or anatomic outcome, and i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 9 to 16 weeks, to about every 9 to 15 weeks, to about every 9 to 14 weeks, to about every 9 to 13 weeks, to about every 9 to 12 weeks, to about every 9 to 11 weeks, to about every 9 to 10 weeks, to about every 10 to 16 weeks, to about every 10 to 15 weeks, to about every 10 to 14 weeks, to about every 10 to 13 weeks, to about every 10 to 12 weeks, to about every 10 to 11 weeks, to about every 11 to 16 weeks, to about every 11 to 15 weeks, to about every 11 to 14 weeks, to about every 11 to 13 weeks, to about every 11 to 12 weeks, to about every 12 to 16 weeks, to about every 12 to 15 weeks, to about every 12 to 14 weeks, to about every 12 to 13 weeks, to about every 13 to 16 weeks, to about every 13 to 15 weeks, to about every 13 to 14 weeks, to about every 14 to 16 weeks, to about every 14 to 15 weeks, or to about every 15 to 16 weeks. In some embodiments, the dosing frequency of administering the VEGF inhibitor to the subject is increased from about every 8 weeks to about every 9 to 12 weeks.

In some embodiments, the methods of treatment may comprise the steps of: a) determining whether the subject has one or more genetic variants associated with visual acuity and/or anatomic outcome by performing or having performed a genotype assay on a DNA sample obtained from the subject to determine if the subject has one or more genetic variants associated with improved visual acuity and/or anatomic outcome, and i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 16 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 15 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 14 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 13 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 12 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 11 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 10 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject from about every 8 weeks to about every 9 weeks.

In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 9 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 10 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 11 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 12 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 13 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 14 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 15 weeks. In some alternative embodiments, the method comprises i) when the subject has one or more of the genetic variants associated with improved visual acuity and/or anatomic outcome, and when the subject exhibits improved visual acuity and/or improvements in one or more anatomic outcomes after about one year of administering the VEGF inhibitor to the subject, increasing the dosing frequency of administering the VEGF inhibitor to the subject to about every 16 weeks.

The methods of treatment may further comprise ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject from about every 8 weeks to about every 4 to 7 weeks, to about every 4 to 6 weeks, to about every 4 to 5 weeks, to about every 5 to 7 weeks, to about every 5 to 6 weeks, or to about every 6 to 7 weeks. In some embodiments, the dosing frequency of administering the VEGF inhibitor to the subject is decreased from about every 8 weeks to about every 4 to 6 weeks.

The methods of treatment may further comprise ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject from about every 8 weeks to about every 7 weeks. In some alternative embodiments, the method comprises ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject from about every 8 weeks to about every 6 weeks. In some alternative embodiments, the method comprises ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject from about every 8 weeks to about every 5 weeks. In some alternative embodiments, the method comprises ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject from about every 8 weeks to about every 4 weeks.

In some alternative embodiments, the method comprises ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject to about every 7 weeks. In some alternative embodiments, the method comprises ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject to about every 6 weeks. In some alternative embodiments, the method comprises ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject to about every 5 weeks. In some alternative embodiments, the method comprises ii) when the subject does not have one or more of the genetic variants associated with improved visual acuity and/or anatomic outcome, and when the subject does not exhibit improved visual acuity and/or improvements in one or more anatomic outcomes after about one year of administering the VEGF inhibitor to the subject, decreasing the dosing frequency of administering the VEGF inhibitor to the subject to about every 4 weeks.

As part of the treatment methods, the one or more genetic variants associated with improved visual acuity and/or anatomic outcome may comprise a single nucleotide polymorphism (SNP). The SNP may comprise one or more of rs2056688, rs5962084, rs5962087, rs5915722, rs5962095, rs2106124, rs1879796, rs12148845, rs12148100, rs17482885, and rs17629019. In some preferred embodiments, the SNP comprises one or more of rs2056688, rs5962084, rs5962087, rs5915722, and rs5962095. In some preferred embodiments, the SNP is rs2056688.

As part of the treatment methods, the VEGF inhibitor is one or more of bevacizumab, ranibizumab, ramucirumab, aflibercept, sunitinib, sorafenib, vandetanib, vatalanib, tivozanib, axitinib, imatinib or pazopanib. In some preferred embodiments, the VEGF inhibitor is ranibizumab or aflibercept. In some preferred embodiments, the VEGF inhibitor is aflibercept.

As part of the treatment methods, an improved visual acuity may comprise a gain of letters. An improved visual acuity may comprise a gain of about 5 or more letters. An improved visual acuity may comprise a gain of about 10 or more letters. An improved visual acuity may comprise a gain of about 15 or more letters.

As part of the treatment methods, an improved anatomic outcome may comprise one or more of decreased intraretinal cystoid edema, a reduction in central retinal thickness, a complete resolution of both intraretinal and subretinal fluid, a reduction in choroidal neovascular (CNV) area, a reduction in total neovascular lesion size, or a reduction in subretinal hyperreflectivity (SHM) material. In some preferred embodiments, the improved anatomic outcome is decreased intraretinal fluid.

As part of the treatment methods, the VEGF inhibitor may be administered by intraocular injection. In some embodiments, the dose of the VEGF inhibitor is from about 1 to about 3 mg per injection. In some embodiments, the dose of the VEGF inhibitor is 2 mg per injection.

Kits

Also described herein are kits for utilizing the methods described herein. The kits described herein can comprise an assay or assays for detecting one or more genetic variants in a sample of a subject.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

VIEW 1 and VIEW 2 are Phase III clinical studies (VEGF Trap-Eye: Investigation of Efficacy and Safety in Wet AMD) of neovascular age-related macular degeneration (AMD), in which treatment subjects received intravitreal injection of aflibercept (Heier J S, et al., Am. Acad. Opthalmol. 119: 2537 (2012)).

The purpose of this statistical study was to identify genetic variants associated with anti-VEGF drug response as measured by visual acuity, anatomic outcomes and treatment frequency in the VIEW 1 study. An overview of the VIEW 1 Study is represented in FIG. 1. The VIEW 1 study evaluated efficacy and safety of intravitreal aflibercept injection (IAI) compared with ranibizumab for treatment of neovascular AMD.

At week 52, all IAI groups demonstrated similar improvements in all visual acuity endpoints compared to Rq4. Incidences of ocular adverse events were similar across all treatment groups; adverse events occurring in >10% of patients were conjunctival hemorrhage, eye pain, retinal hemorrhage, and reduced visual acuity.

Figure 3:
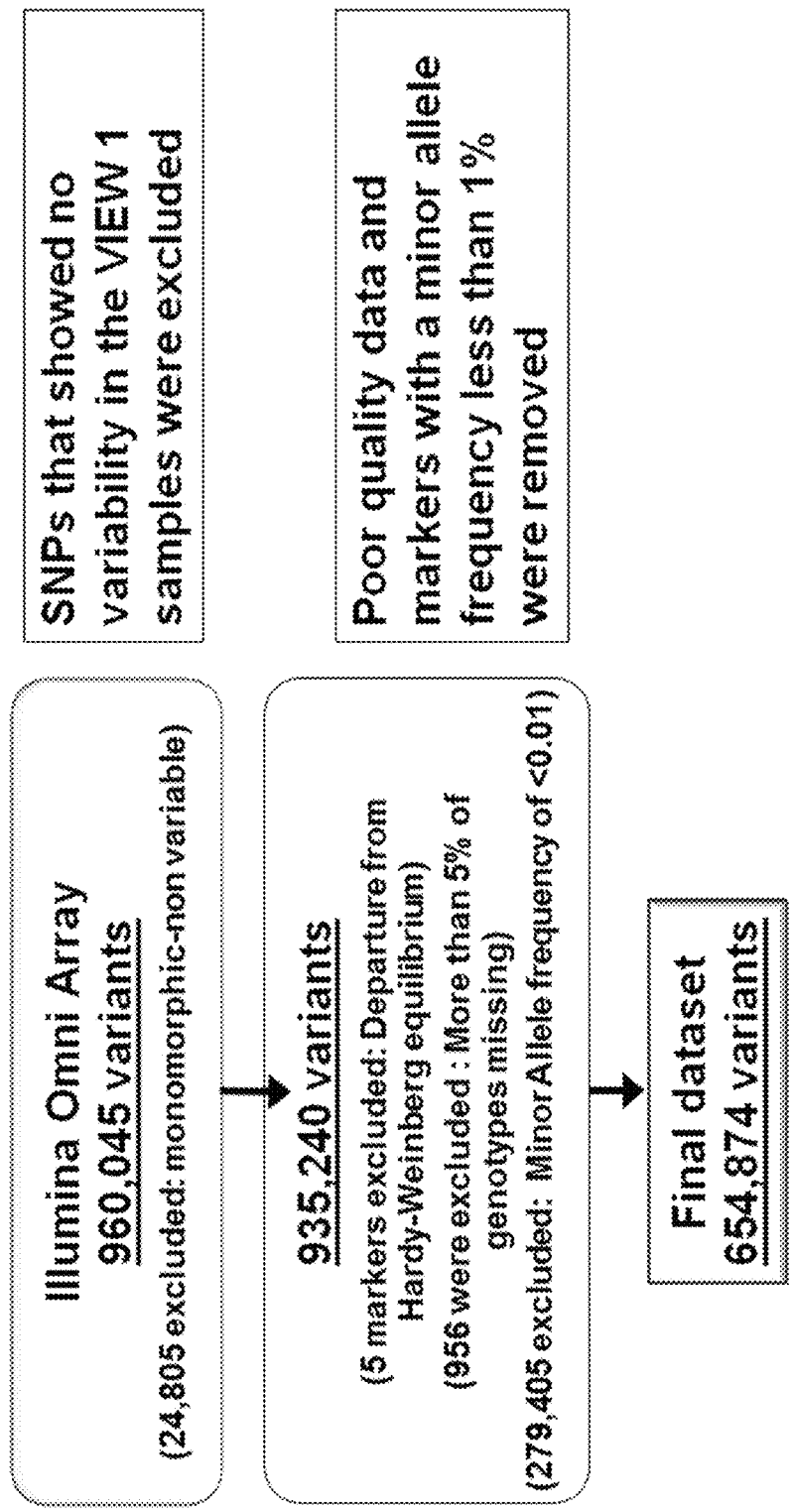
FIG. 3 shows quality control measures applied to SNPs on chip to generate a final sample set for the VIEW 1 study in 154 sites in the U.S. and Canada (~96% Caucasian randomized).
Figure 4:
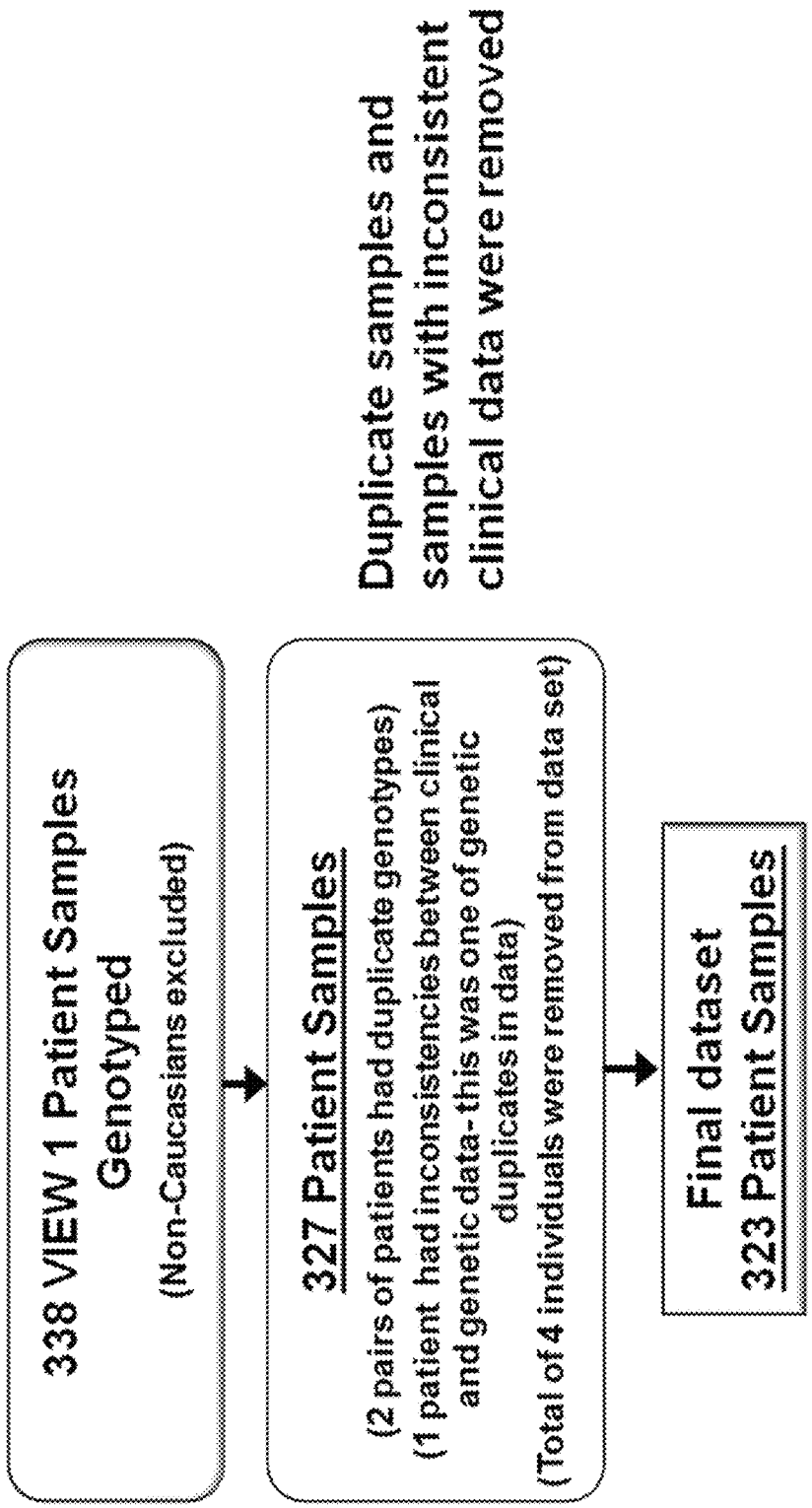
FIG. 4 shows quality control measures applied to SNPs on chip to generate a final sample set for the VIEW 1 study.

A genome wide association study (GWAS) was conducted on 362 VIEW 1 patients. DNA samples were genotyped using the Illumina Omni Express Exome Chip. Logistic regression with baseline values was performed to establish the association between genetic variants and efficacy variables. GWAS analysis of approximately 1 million variants was performed. The association between genetic variants and efficacy variables were determined using logistic regression with baseline values. All treatment arms were combined. For each SNP, genotypes were coded according to an additive mode of inheritance. Variants associated with gaining ETDRS letters at week 52, presence of intraretinal cystoid edema (fluid as measured by time domain optical coherence tomography (TD-OCT)) at week 52 and frequency of treatment at week 96 were evaluated. Variants were also associated with treatment burden. Specifically, patients requiring more than 7 injections from Week 52 to Week 96 [2nd Year of Study] were analyzed. In addition, variants were associated with the presence of intra-retinal cystoid edema (Defined as Fluid) at Week 52. Patient demographics and baseline characteristics of VIEW 1 were also identified. (See FIG. 2). Quality control measures were applied to SNPs on chip to generate a final sample set. (See FIGS. 3 and 4).

Figure 5:
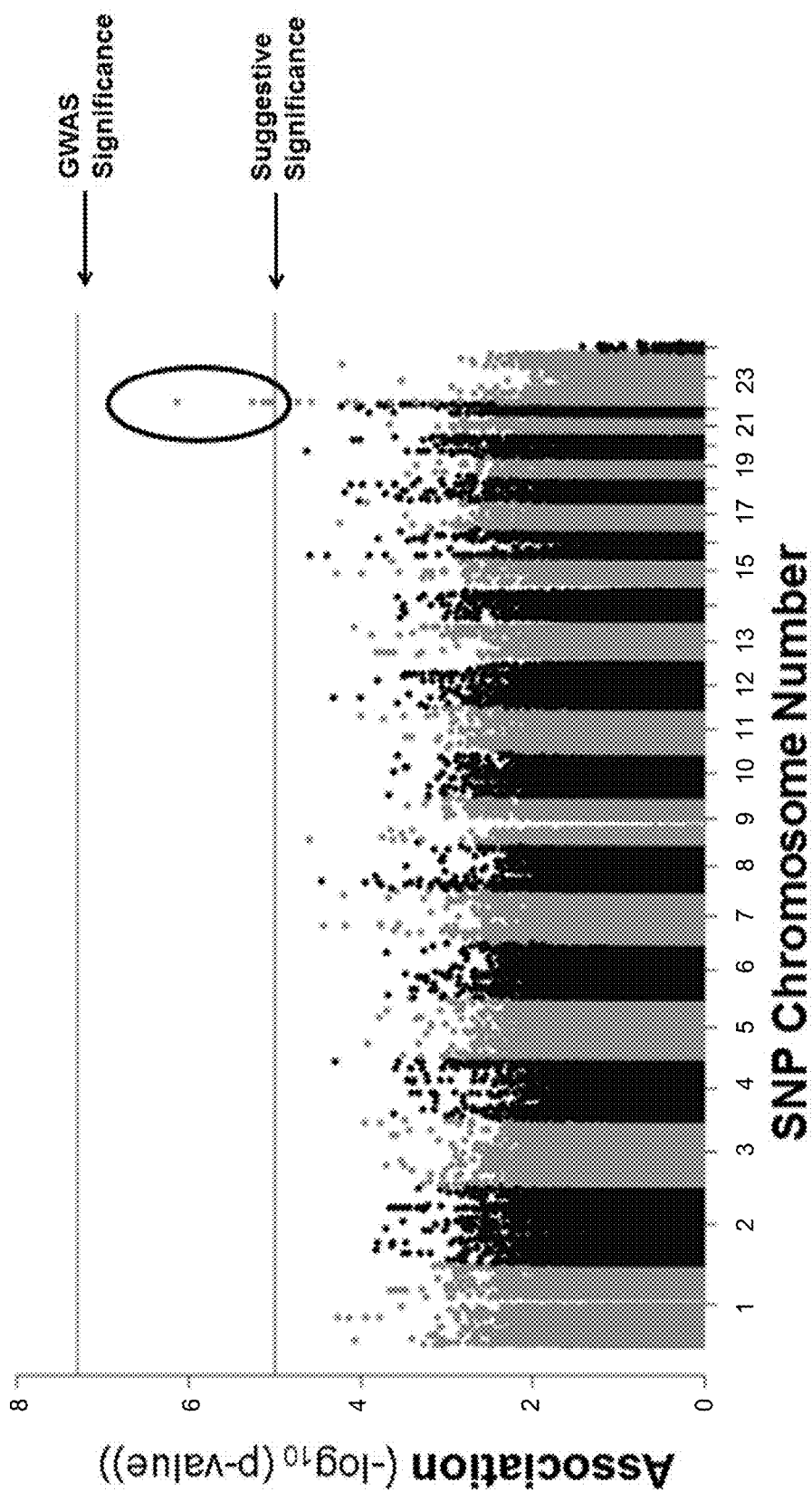
FIG. 5 shows an anatomical response, namely the X-chromosome SNP (rs2056688), which revealed the highest association with anatomical outcome, demonstrating an odds ratio (OR) of 0.2578 and a point-wise association (p-value $7.27 \times 10^{-7}$) with presence of intraretinal fluid at week 52.

Anatomical response, namely the X-chromosome SNP (rs2056688) revealed the highest association with anatomical outcome, demonstrating an odds ratio (OR) of 0.2578 and a point-wise association (p-value $7.27 \times 10^{-7}$) with presence of intraretinal fluid at week 52. (See FIG. 5).

Figure 6:
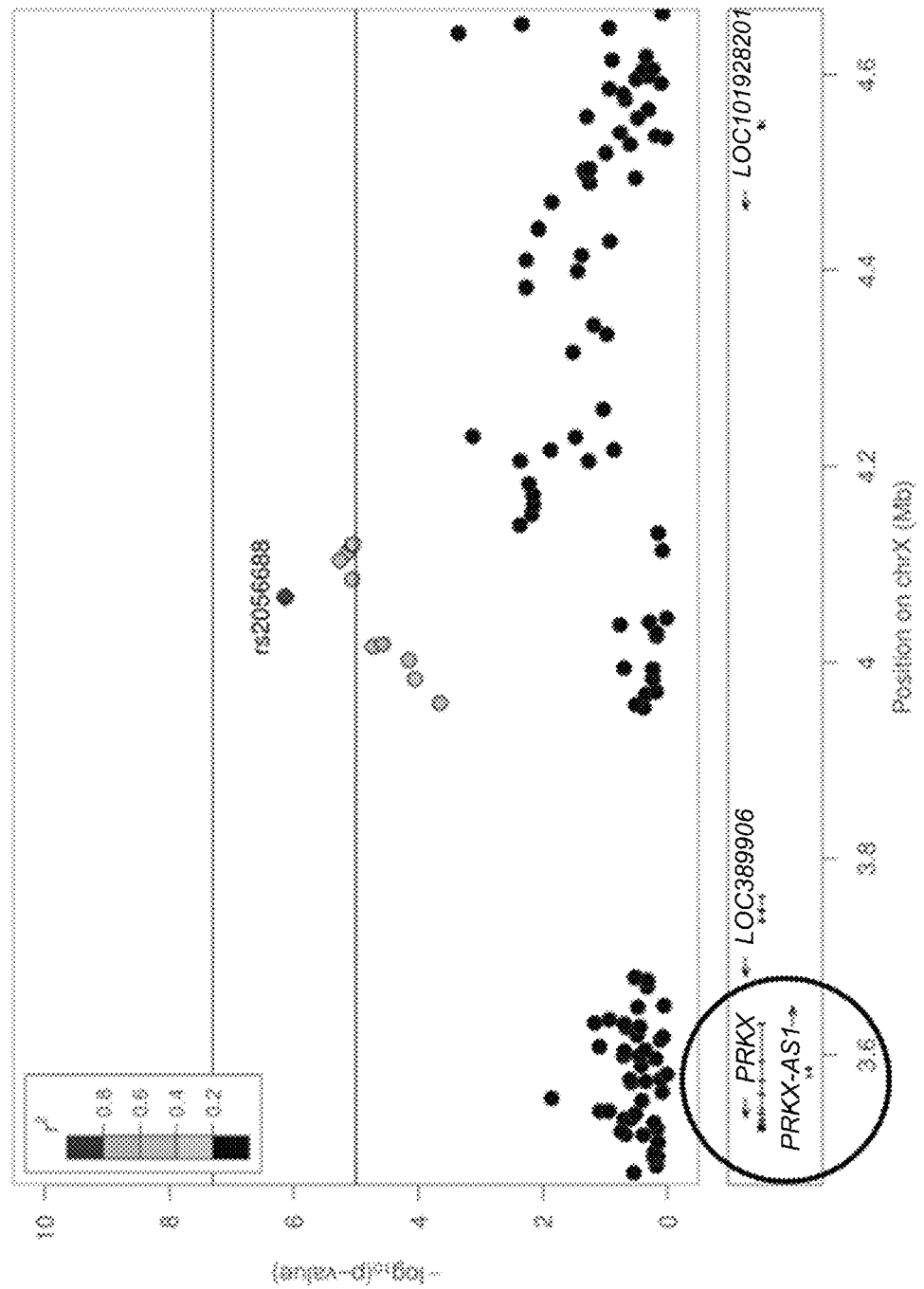
FIG. 6 shows the rs2056688 SNP was located in a non-coding region, with the closest relevant functional gene (Protein Kinase X-Linked (PRK-X)) mapping ~400 kb upstream of the putative variant.

Four neighboring SNPs (rs5962084, rs5962087, rs5915722, rs5962095) revealed similar ORs (0.3151-0.3461) and point-wise associations ($5.48 \times 10^{-6}$-$8.59 \times 10^{-6}$). The rs2056688 SNP was located in a non-coding region, with the closest relevant functional gene (Protein Kinase X-Linked (PRK-X)) mapping ~400 kb upstream of the putative variant. (See FIG. 6). Additional SNPs with lower significance were found in association with proportion of patients with ETDRS letters gains in vision at week 52 and frequency of treatment at week 96.

Figure 7:
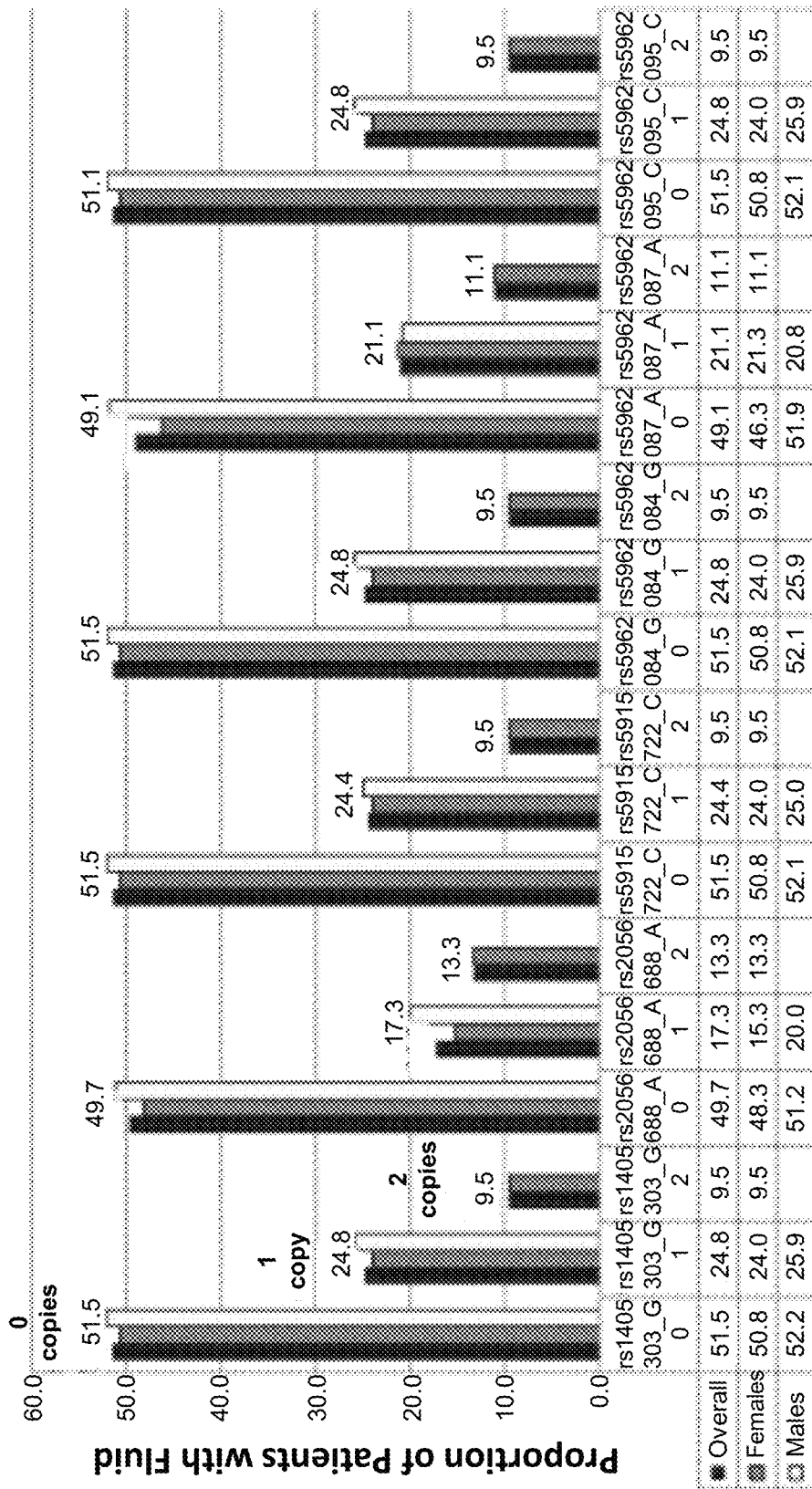
FIG. 7 shows additional neighboring SNPs showed a dose effect.

Additional neighboring SNPs showed a dose effect. Increasing the number of variant copies from 0→1→2 was found to reduce the likelihood of fluid present at Week 52 from ~50% to ~25% to ~10%. (See FIG. 7). FIG. 8 summarizes the SNPs identified in the study.

Conclusions: A GWAS in neovascular AMD patients undergoing anti-VEGF treatment in the VIEW 1 trial identified a suggestive association between a genetic variant and the presence of intraretinal fluid at week 52 as measured by TD-OCT. The variant was located at a position on the X chromosome near the gene for PRK-X, a serine/threonine protein kinase involved in angiogenesis.

What is claimed is:

1. A method for treating a macular degeneration patient with a vascular endothelial growth factor (VEGF) inhibitor, comprising the steps of:

determining whether the patient has one or more of the genetic variants rs2056688, rs5962084, rs5962087, rs5915722, and rs5962095, by performing or having performed a genotype assay on a DNA sample obtained from the patient; and modifying the dosing frequency after about one year of administering about 2 mg of the VEGF inhibitor to the patient from about every 8 weeks to about every 9 to 12 weeks to a patient having one or more of the genetic variants; or modifying the dosing frequency after about one year of administering about 2 mg of the VEGF inhibitor to the patient from about every 8 weeks to about every 4 to 6 weeks to a patient not having one or more of the genetic variants.

2. The method of claim 1, wherein the genetic variant is rs5962087.

3. The method of claim 1, wherein the genetic variant is rs5962084.

4. The method of claim 1, wherein the genetic variant is rs2056688.

5. The method of claim 1, wherein the VEGF inhibitor is ranibizumab or aflibercept.

6. The method of claim 1, wherein the VEGF inhibitor is aflibercept.

7. The method of claim 4, wherein the VEGF inhibitor is aflibercept.

8. The method of claim 1, wherein the dosing frequency of administering about 2 mg of the VEGF inhibitor to the patient having one or more of the genetic variants is modified from about every 8 weeks to about every 9 weeks.

9. The method of claim 1, wherein the dosing frequency of administering about 2 mg of the VEGF inhibitor to the patient having one or more of the genetic variants is modified from about every 8 weeks to about every 10.

10. The method of claim 1, wherein the dosing frequency of administering about 2 mg of the VEGF inhibitor to the patient having one or more of the genetic variants is modified from about every 8 weeks to about every 11 weeks.

11. The method of claim 1, wherein the dosing frequency of administering about 2 mg of the VEGF inhibitor to the patient having one or more of the genetic variants is modified from about every 8 weeks to about every 12 weeks.

12. The method of claim 1, wherein the dosing frequency of administering about 2 mg of the VEGF inhibitor to the patient not having one or more of the genetic variants is modified from about every 8 weeks to about every 4 weeks.

13. The method of claim 1, wherein the dosing frequency of administering about 2 mg of the VEGF inhibitor to the patient not having one or more of the genetic variants is modified from about every 8 weeks to about every 5 weeks.

14. The method of claim 1, wherein the dosing frequency of administering about 2 mg of the VEGF inhibitor to the patient not having one or more of the genetic variants is modified from about every 8 weeks to about every 6 weeks.

15. The method of claim 1, wherein the genetic variant is rs5915722.

16. The method of claim 1, wherein the genetic variant is rs5962095.

* * * * *